(12) United States Patent
Baldauf et al.

(10) Patent No.: US 8,545,725 B2
(45) Date of Patent: Oct. 1, 2013

(54) METHOD AND FACILITY FOR CONVERTING CARBON MONOXIDE AND WATER INTO CARBON DIOXIDE AND HYDROGEN, WITH THE REMOVAL OF AT LEAST ONE PRODUCT GAS

(75) Inventors: Manfred Baldauf, Erlangen (DE); Carsten Graeber, Erlangen (DE); Marc Hanebuth, Hamburg (DE); Gerhard Zimmermann, Höchstadt/Aisch (DE)

(73) Assignee: Siemens Aktiengesellschaft, Munich (DE)

( * ) Notice: Subject to any disclaimer, the term of this patent is extended or adjusted under 35 U.S.C. 154(b) by 43 days.

(21) Appl. No.: 13/387,182

(22) PCT Filed: Jun. 28, 2010

(86) PCT No.: PCT/EP2010/059115
§ 371 (c)(1),
(2), (4) Date: Jan. 26, 2012

(87) PCT Pub. No.: WO2011/012387
PCT Pub. Date: Feb. 3, 2011

(65) Prior Publication Data
US 2012/0119151 A1 May 17, 2012

(30) Foreign Application Priority Data
Jul. 30, 2009 (DE) .......................... 10 2009 035 387

(51) Int. Cl.
*C01B 3/38* (2006.01)
*C01B 3/24* (2006.01)
(52) U.S. Cl.
USPC ......................................... 252/373; 423/650

(58) Field of Classification Search
USPC ......................................................... 423/650
See application file for complete search history.

(56) References Cited

U.S. PATENT DOCUMENTS

| 3,772,380 A | 11/1973 | Hershman |
| 4,145,405 A | 3/1979 | Gorin |

FOREIGN PATENT DOCUMENTS

| CN | 101313432 A | 11/2008 |
| DE | 1147214 B | 4/1963 |
| EP | 0299995 B1 | 10/1991 |

OTHER PUBLICATIONS

Reutemann, W et al.: "Formic Acid" Ullmann's Encyclopedia of Industrial Chemistry Jun. 15, 2000. pp. 1-22, Online DOI:DOI:10. 1002/14356007.a12_013/pdf [found on Sep. 22, 2010]; Others.

*Primary Examiner* — Melvin C Mayes
*Assistant Examiner* — Kenneth Vaden

(57) ABSTRACT

A process for carrying out a carbon monoxide shift reaction is provided. In the implementation of the carbon monoxide shift reaction, including the conversion of carbon monoxide and water into carbon dioxide and hydrogen, this conversion takes place in the liquid phase and involves separation of the product gases carbon dioxide and/or hydrogen, where as a first solvent dry methanol is used, for the absorption of carbon monoxide with simultaneous formation of a methyl formate, as a second solvent, in the area of release of the product gases, water is used, for avoiding hydrogen losses in a carbon dioxide area.

13 Claims, 1 Drawing Sheet

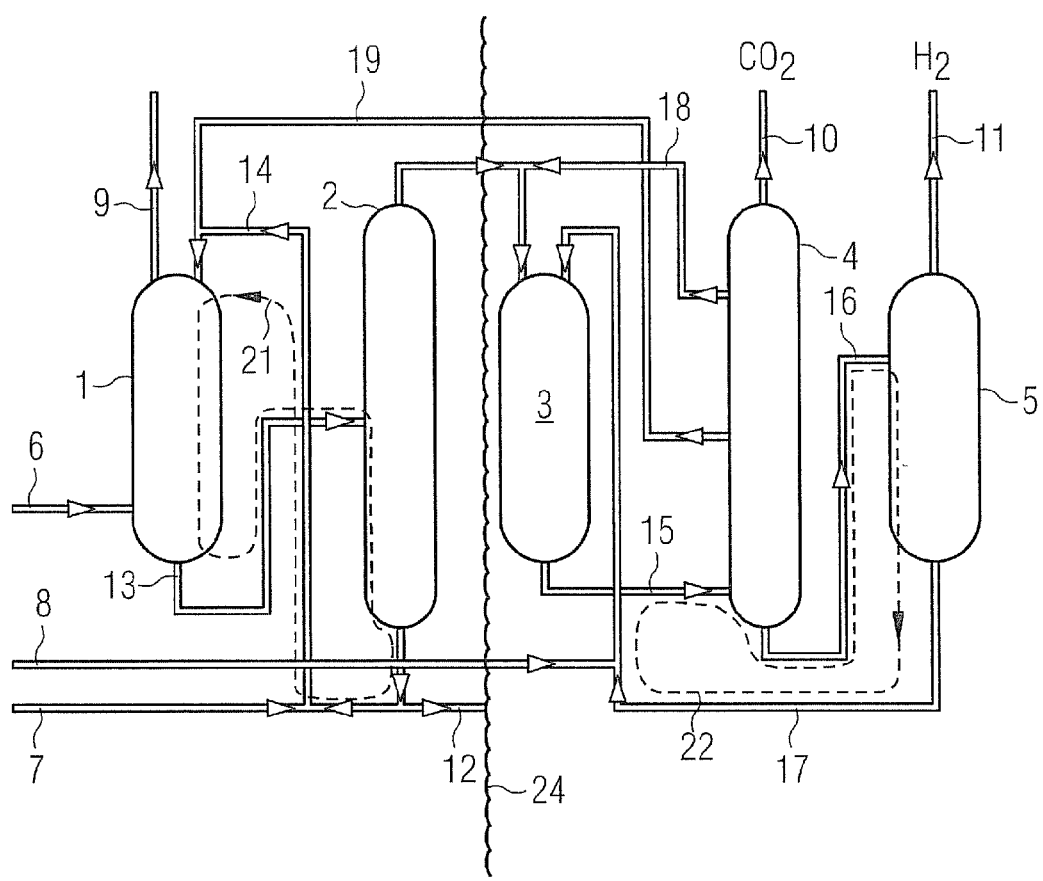

METHOD AND FACILITY FOR CONVERTING CARBON MONOXIDE AND WATER INTO CARBON DIOXIDE AND HYDROGEN, WITH THE REMOVAL OF AT LEAST ONE PRODUCT GAS

CROSS REFERENCE TO RELATED APPLICATIONS

This application is the US National Stage of International Application No. PCT/EP2010/059115, filed Jun. 28, 2010 and claims the benefit thereof. The International Application claims the benefits of German application No. 10 2009 035 387.9 DE filed Jul. 30, 2009. All of the applications are incorporated by reference herein in their entirety.

FIELD OF INVENTION

The invention relates to a carbon monoxide shift reaction for converting carbon monoxide and water into carbon dioxide and hydrogen, in particular for industrial use.

BACKGROUND OF INVENTION

This reaction corresponding to the equation $CO+H_2O \rightarrow CO_2+H_2$ is among the most important reactions in the chemical industry. Now, this reaction has also gained interest for power stations using fossil fuels. The background to this is the present trend toward low-$CO_2$ combustion in the firing of these power stations. In the precombustion approach, the carbon monoxide has to be converted into carbon dioxide according to the abovementioned equation (1) before combustion in order to be able to separate off the entire carbon in the foam of carbon dioxide. In this way, the energy of the carbon monoxide is transferred (shifted) to hydrogen which can be used in the gas turbines. However, for the removal of the products carbon dioxide and also hydrogen, separation from the gas phase is highly energy-consuming.

In the approaches customary to date, the carbon monoxide shift reaction and the removal of the carbon dioxide are carried out in essential separate substeps. Firstly, the carbon monoxide shift reaction is carried out in the gas phase. The carbon dioxide is then separated off in a further process step. A typical example of the removal is the Rectisol scrub in which the carbon dioxide is absorbed in cooled methanol. Appropriately low temperatures are necessary here in order to separate off the carbon dioxide, and a great amount of energy is necessary for cooling, which reduces the overall efficiency of the power station.

The European patent EP 0 299 995 B1 describes a process for carrying out the carbon monoxide shift reaction, with this proceeding in the liquid phase. At the same time, removal of the carbon dioxide formed can be realized. This applies particularly to example 6 of the patent document and also to FIG. 2. Here, water-containing methanol is used as solvent. The pH of the methanol is increased by addition of a carbonate, for example potassium carbonate. However, there are two important points in this patent document which make use appear questionable: it is not ensured that the gaseous starting material carbon monoxide (CO) can be converted significantly quickly into the liquid phase for industrial use in order then to be converted into formate. Furthermore, a significant loss of hydrogen in the carbon dioxide stream separated off has to be expected because of the relatively high solubility in the solvent used.

SUMMARY OF INVENTION

The problem to be solved is to carry out the carbon monoxide shift reaction in improved form, with the product gases hydrogen and carbon dioxide being formed and at least one of these being separated off.

The improved carbon monoxide shift reaction in the liquid phase with simultaneous removal of at least one product gas is achieved by the combination of features in the respective main claims.

The invention describes a process in which the carbon monoxide shift reaction is carried out in the liquid phase. Within the process, two different solvents are used. Dry methanol is used as first solvent and water is used as second solvent. The absorption of carbon monoxide in dry methanol can be exploited advantageously since the formation of methyl formate occurs at the same time when a suitable catalyst is used. A high conversion is thus achieved in the binding of carbon monoxide.

This occurs very advantageously in dry methanol as first solvent, in combination with dissolved sodium methoxide as catalyst. The kinetics of the binding of carbon monoxide and conversion of carbon monoxide can be operated economically similarly to the industrial preparation of formic acid.

The methyl formate is cleaved hydrolytically or in the presence of a basic catalyst into formic acid and methanol. The formic acid formed is deprotonated to formate in an adjustable basic pH range, so that the pH drops during the course of the reaction.

As a result of the first solvent, viz. dry methanol, and the second solvent, viz. water, each being conveyed in a different circuit, the liberation of the product gases carbon dioxide and hydrogen can be effected without great losses of hydrogen into the carbon dioxide or into the carbon dioxide stream. This means that, particularly as a result of the separation into the two different circuits of the solvents, the individual product gases do not get into the region or the stream of the other gas in each case.

There is a physical separation between the formation of the two gases hydrogen and carbon dioxide and the removal of these product gases is made possible at the same time.

The two product gases hydrogen and carbon dioxide are produced in an aqueous and not methanolic environment as in the prior art according to the European patent EP 0 299 995 B1. In methanol, large losses of hydrogen into the carbon dioxide produced would otherwise be the consequence, since hydrogen is significantly more soluble in methanol than in water.

The product gas hydrogen can advantageously be produced by catalytic decomposition of formate, with hydrogencarbonate being additionally formed.

The product gas carbon dioxide can advantageously be formed from hydrogencarbonate at another place in the course of the process by increasing the temperature or reducing the pressure. Carbonate formed reacts with water, resulting in the pH increasing.

There is a physical separation between the formation of the two gases hydrogen and carbon dioxide and removal of these product gases is made possible at the same time.

The present invention has a significantly altered process structure compared to processes known hitherto for carrying out the carbon monoxide shift reaction. Here, the solvents methanol and water are used in two separate circuits.

The initial process steps according to the invention are carried out in a manner similar to industrial formic acid production. A difference is that pure carbon monoxide does not have to be fed to the process, but instead, for example, a synthesis gas having a substantial proportion of carbon monoxide is fed in dried form to the process. The drying of the synthesis gas is necessary since the first process steps occur in a methanol environment.

The occurrence of the CO shift reaction in the liquid phase has an energy advantage over the CO shift reaction carried out in the gaseous phase since no water has to be vaporized for carrying out the reaction. This advantage is all the greater when the CO shift reaction is carried out under an excess of water, which is often the case.

The primary objective is to produce an aqueous formic acid solution. The difference between the mode of operation for formic acid production and the mode of operation according to the invention is that in formic acid production, concentration of the formic acid essentially represents a problem which has to be solved. However, this substep is not necessary for the purposes of the present invention. Rather, the formic acid is deprotonated in its diluted form and the formate formed is decomposed catalytically. An ester, in particular methyl formate, is formed as intermediate and is separated off from the solvent methanol and cleaved into methanol and formic acid. In a further process step, methanol is then recovered and carbon dioxide, which is formed by decomposition of hydrogencarbonate, is at the same time separated off in a further stream. The production of hydrogen occurs in a further reaction volume by reaction of formate with water to give hydrogencarbonate and hydrogen. Carbon dioxide and hydrogen are thus formed separately in two different process steps and are in each case separated off.

BRIEF DESCRIPTION OF THE DRAWINGS

An example which does not restrict the invention is described below with the aid of the accompanying FIGURE.

DETAILED DESCRIPTION OF INVENTION

The FIGURE shows the process flow diagram for the carbon monoxide shift reaction using three reactors 1, 3, 5 and two columns 2, 4, with dried synthesis gas being fed in via the feed line 6 and product gases carbon dioxide and hydrogen being formed and separated off at various places in the process, and also a first circuit 21 for the first solvent, viz. dry methanol, and a second circuit 22 for the second solvent, viz. water.

The carbon monoxide shift reaction and also subreactions occurring in the overall process are described below.

The carbon monoxide shift reaction is, overall:

for formic acid production and the mode of operation according to the invention is that in formic acid production, concentration of the formic acid essentially represents a problem which has to be solved. However, this substep is not necessary for the purposes of the present invention. Rather, the formic acid is deprotonated in its diluted form and the formate formed is decomposed catalytically. An ester, in particular methyl formate, is formed as intermediate and is separated off from the solvent methanol and cleaved into methanol and formic acid. In a further process step, methanol is then recovered and carbon dioxide, which is formed by decomposition of hydrogencarbonate, is at the same time separated off in a further stream. The production of hydrogen occurs in a further reaction volume by reaction of formate with water to give hydrogencarbonate and hydrogen. Carbon dioxide and hydrogen are thus formed separately in two different process steps and are in each case separated off.

An example which does not restrict the invention is described below with the aid of the accompanying FIGURE.

The FIGURE shows the process flow diagram for the carbon monoxide shift reaction using three reactors 1, 3, 5 and two columns 2, 4, with dried synthesis gas being fed in via the feed line 6 and product gases carbon dioxide and hydrogen being formed and separated off at various places in the process, and also a first circuit 21 for the first solvent, viz. dry methanol, and a second circuit 22 for the second solvent, viz. water.

The carbon monoxide shift reaction and also subreactions occurring in the overall process are described below.

The carbon monoxide shift reaction is, overall:

$$CO + H_2O \rightarrow CO_2 + H_2 \tag{1}$$

The absorption of carbon monoxide in the liquid phase to form methyl formate can be represented by the following equation:

$$CO + CH_3OH \rightarrow CH_3OOCH \tag{2}$$

Since synthesis gas is introduced into dry methanol, water is not present as solvent at this point. The synthesis gas consists essentially of carbon monoxide and hydrogen. As a result of the separation of the solvents into dry methanol and water, losses of hydrogen, for example, into the carbon dioxide stream are prevented from the beginning.

The methyl formate formed is catalytically cleaved into formic acid and methanol, which equates to a hydrolysis.

$$CH_3OOCH + H_2O \rightarrow CH_3OH + HCOOH \tag{3}$$

The formic acid fanned is converted by deprotonation into formate.

$$HCOOH + OH^- \rightarrow HCOO^- + H_2O \tag{4}$$

Hydrogen is produced by catalytic decomposition of formate into hydrogen and hydrogencarbonate.

$$HCOO^- + H_2O \rightarrow HCO_3^- + H_2 \tag{5}$$

The liberation of the carbon dioxide at a place different from that where the hydrogen is liberated proceeds according to the following equation:

$$2HCO_3^- \rightarrow CO_2 + CO_3^{2-} + H_2O \tag{6}$$

Carbonate formed reacts with water so that the pH again increases to an original value.

$$CO_3^{2-} + H_2O \rightarrow HCO_3^- + OH^- \tag{7}$$

The equations (2)-(7) together give the equation (1). The present concept is based only in parts on the production of formic acid. However, in conjunction with the field of use of the carbon monoxide shift reaction in power stations with carbon dioxide removal, the ideally complete and selective separation of the carbon-containing components from the synthesis gas rather than the synthesis of formic acid is the important aspect.

The carbon monoxide shift reaction in the liquid phase proceeds via an aqueous formic acid solution. The direct formation of dissolved formic acid from gaseous carbon monoxide proceeds according to the following reaction equation:

$$CO(gas) + H_2O(liquid) \rightarrow HCOOH(aqueous) \tag{8}$$

A problem associated with equation 8 is that it has a very low equilibrium conversion under typical conditions. This reaction can thus not be operated economically without further measures. The approach described in EP 0 299 995 B1 for overcoming this equilibrium limitation employs deprotonation of the formic acid by means of relatively high pH values to withdraw the formic acid from the equilibrium. In this way, the total carbon monoxide content can in principle be transferred from the gas phase into the liquid phase in the form of dissolved formate. However, owing to the aqueous methanol as solvent, this approach leads to large losses of hydrogen, with amounts of hydrogen being discharged into the carbon dioxide stream and the energy consumption being uneconomically high.

Furthermore, it has been found that a simple process structure as is known, for example, from EP 0 299 995 B1, cannot give satisfactory results because of complicated coupling of the chemical reactions. When the solvent proposed in the patent, viz. methanol having a low water content, is used, a significant proportion of the hydrogen dissolves in the solvent. This unwanted escape of hydrogen into the carbon dioxide stream can only be prevented by the use of a further solvent which is conveyed in a second circuit.

Another mode of operation in which only the solvent water is used instead of methanol has not led to an economic system. Although the loss of hydrogen can be reduced to a few parts per thousand of the total hydrogen content in this mode of operation, the amount of water required, even if it were circulated, would be tremendously high. A measure of this is the amount of carbon dioxide to be separated off, which in combination with the solubility of the gas in water determines the water consumption. This large water stream results in an extraordinarily high energy consumption since the carbon dioxide is separated off by increasing the temperature.

An alternative removal by reducing the pressure would result in very high operating pressures and likewise a high energy consumption.

To overcome the equilibrium limitation of the equation (8), a particular approach is possible. This approach does not involve direct production of a formate solution. Rather, methyl formate is formed from a methanolic environment, according to equation (2). In the further course of the process, methyl formate is hydrolyzed and converted into a formate solution, according to equation (3). The additional process steps for this sequential procedure increase the total energy consumption only insignificantly. Overall, it is thus possible to achieve an economical removal of carbon dioxide while simultaneously carrying out the CO shift reaction by means of this process. If, in addition, a water-free methanol is used as a first solvent, a high conversion is achieved in the binding of carbon monoxide since the carbon monoxide reacts with methanol to form methyl formate.

As shown in the FIGURE, a plurality of reactors and columns are used for carrying out the carbon monoxide shift process.

A first reactor 1 is used for the absorption of carbon monoxide with simultaneous formation of methyl formate, according to equation (2). In the subsequent first column 2, the methyl formate is separated off. In the subsequent second reaction 3, the methyl formate is cleaved according to equation (3) into methanol and formic acid. In the subsequent second column 4, the carbon dioxide is separated off, according to equation (6), with carbonate and hydrogencarbonate being able to react according to equations (6) and (7). In the third reactor 5, hydrogen is separated catalytically from the formate, giving hydrogencarbonate.

The FIGURE can be divided roughly into a methanolic region and an aqueous region. Based on an interrupted separation line 24 running vertically in the FIGURE between the first column 2 and the second reactor 3, the methanolic region is on the left of the line and the aqueous region is on the right of the line.

In the methanolic region, dried synthesis gas is preferably fed via the feed line 6 into the first reactor 1. The synthesis gas is dried so that no water is present before the actual process. Apart from the improved separation between carbon dioxide and hydrogen, drying of the synthesis gas is necessary to prevent hydrolysis of a methoxide catalyst used. Further methanol and appropriate catalyst are introduced via the lines 7 and 14. Line 19 serves for recirculation of methanol into the first reactor 1 from the second column 4. Methyl formate and methoxide, which are dissolved in methanol, are conveyed via line 13 from the first reactor 1 to the first column 2. The first circuit 21 for the solvent methanol runs principally via the lines 14 and 13, with the circuit being closed via the first column 2 whose bottoms are conveyed in line 14. Stream 12 is necessary to discharge undesirable solids which can be formed by decomposition of the catalyst. This first circuit 21 for dry methanol ensures that inclusion of aqueous phase is essentially prevented. This ensures optimal absorption of carbon monoxide.

Furthermore, the first column 2 is located in the methanolic region. Here, a separation of material is carried out, with methyl formate being separated off and transferred to the second reactor 3. Furthermore, only methyl formate is distilled off from this first column 2 and methanol and carbon dioxide are additionally distilled off from the second column 4, while the higher-boiling solvents of the two circuits mentioned are removed via the respective bottoms. An advantage obtained is a lower overall energy consumption.

In the aqueous region, corresponding to the right-hand part of the FIGURE, the cleavage of the methyl formate, as per equation (3), is firstly carried out in the second reactor 3. The products methanol and formic acid go via line 15 into the second column 4. From the second column 4, aqueous formic acid which can at this point already be present in deprotonated form as formate is fed via line 16 to the third reactor 5, methanol is fed via line 19 to the first reactor 1 and unreacted methyl formate is fed via line 18 to the second reactor 3. From the third reactor 5, hydrogen is firstly formed and driven off and secondly hydrogencarbonate in aqueous solution is recirculated to the second reactor 3. The second circuit 22 is essentially represented by the line 17, the second reactor 3, the line 15, the line 16 and the third reactor 5, again adjoined by the line 17. This water circuit has the advantage that hydrogen is only insignificantly dissolved and is removed at the place at which it is produced.

Line 8 serves for the supply water and accordingly extends into the aqueous region. Line 9 serves to discharge gases which are inert in the reaction, i.e. the gases which have not reacted in the first reactor 1, with hydrogen being able to be present.

In the first column 2, the methyl formate formed is distilled off. The energy consumption here is acceptable since the methyl formate formed boils at a relatively low temperature. At atmospheric pressure, the boiling point is only 32° C. The methanol remaining in the distillation is continuously recirculated essentially via line 14 to the preceding first reactor 1. Possible degradation products of a catalyst crystallize out here and are removed from the process. For example, the catalyst, a methoxide, can react with any traces of water and form methanol and a hydroxide. Hydroxides are typically only very sparingly soluble in methanol, so that they precipitate at this point and can be removed without problems from the methanol. Owing to this possible decomposition reaction, care should be taken to ensure that the carbon monoxide-containing feed gas is water-free. With probability approaching certainty, it is not possible to replace methoxide as catalytically active species by a less hydrolysis-sensitive species. A very strong nucleophile is required to react with carbon monoxide, which automatically means a hydrolysis-sensitive substance. In addition, other alkoxides or other strong organic bases are disadvantageous since in a transesterification they would form esters having higher boiling points instead of methyl formate or in automatically occurring acid-based reactions would form alcohols or organic acids having a boiling point higher than that of methanol.

The consequence would be an increased energy consumption in the columns. Methoxides are the only substances which form precisely the same esters in the transesterification, so that this unavoidable reaction cannot have an adverse effect due to the formation of higher-boiling esters.

While the first solvent in the first two components, viz. the first reactor 1 and the first column 2, is dry methanol, an aqueous solution is present in the subsequent second reaction 3. Here, the ester is cleaved, typically in a 5-fold excess of water, with this reaction typically occurring in the presence of an acid or base catalyst. A base-catalyst variant is useful since the formic acid formed in the hydrolysis is immediately deprotonated to formate.

The second column 4 follows, and from this the unhydrolyzed ester and methanol foamed in the hydrolysis are recirculated to the respective reactors. Furthermore, this second column 4 is suitable for driving off dissolved carbon dioxide, with part of the hydrogencarbonate and, even to a small extent, carbonate being converted into gaseous carbon dioxide by means of a temperature-dependent equilibrium in the reaction between carbonate, hydrogencarbonate and carbon dioxide. The removal of the substances mentioned by distillation leads to an aqueous formate solution. This is introduced into the third reactor 5 in which the formate is decomposed in a catalyzed reaction and hydrogen is formed.

The invention claimed is:

1. A process for carrying out a carbon monoxide shift reaction, comprising:
    converting carbon monoxide and water into carbon dioxide and hydrogen, with this proceeding in the liquid phase and the removal of a product gas comprising carbon dioxide and hydrogen occurring,
    wherein dry methanol is used as a first solvent for the absorption of carbon monoxide with simultaneous formation of methyl formate, and
    wherein water is used as a second solvent in a region of the liberation of the product gas to avoid losses of hydrogen in a carbon dioxide region.

2. The process as claimed in claim 1, wherein the methyl formate is cleaved hydrolytically into methanol and formic acid or, at a higher pH, into methanol and formate.

3. The process as claimed in claim 1, wherein the product gases carbon dioxide and hydrogen are produced physically separately from one another in aqueous solution.

4. The process as claimed in claim 1,
    wherein a dry synthesis gas comprising carbon monoxide and hydrogen is dissolved in dry methanol in a first reactor to form methanol formate which is fed to a first column,
    wherein the methyl formate is separated off in the first column,
    wherein the cleavage of the methyl formate either into methanol and formic acid or into methanol and formate occurs in aqueous solution in a second reactor, with either the methanol and the formic acid or the methanol and the formate being fed to a second column,
    wherein the separation of carbon dioxide, methyl formate and methanol occurs in the second column, with methyl formate being fed to the second reactor, methanol being fed to the first reactor and the product gas carbon dioxide being separated off and aqueous formic acid or aqueous formate being fed to a third reactor, and
    wherein the catalytic decomposition of formic acid or formate into hydrogencarbonate occurs in the third reactor, with hydrogen being separated off as the product gas.

5. The process as claimed in claim 4, wherein the first solvent is conveyed in a first circuit.

6. The process as claimed in claim 4, wherein the reaction to produce hydrogen from the formate and water in the third reactor is aided by a heterogeneous catalyst.

7. The process as claimed in claim 6, wherein the heterogeneous catalyst is a transition metal.

8. The process as claimed in claim 1, wherein the reaction to form the methyl formate is aided by a catalyst.

9. The process as claimed in claim 8, wherein the catalyst comprising methoxide is used.

10. The process as claimed in claim 9, wherein the catalyst comprising sodium methoxide is used.

11. The process as claimed in claim 9, wherein the catalyst consists of a transition metal.

12. The process as claimed in claim 11, wherein the catalyst consists of palladium.

13. The process as claimed in claim 1, wherein the second solvent is conveyed in a second circuit.

\* \* \* \* \*